United States Patent [19]
Lutz

[11] Patent Number: 5,936,199
[45] Date of Patent: Aug. 10, 1999

[54] INSULATING COVERS FOR AN ELECTRICAL OUTLET BOX

[76] Inventor: George P. Lutz, 4717 Pembroke Ct., Pittsburgh, Pa. 15101

[21] Appl. No.: 08/895,732

[22] Filed: Jul. 17, 1997

Related U.S. Application Data

[63] Continuation of application No. 08/688,536, Jun. 17, 1996, abandoned.

[51] Int. Cl.[6] .................................................. H01H 9/02
[52] U.S. Cl. .............................................. 174/53; 220/3.8
[58] Field of Search ................... 174/53, 66, 67, 174/54, 55, 35 GC, 138 F; 220/241, 242, 3.8

[56] References Cited

U.S. PATENT DOCUMENTS

| | | | |
|---|---|---|---|
| 1,752,322 | 4/1930 | Adam | 174/53 |
| 2,985,334 | 5/1961 | Slater | 220/242 |
| 2,987,214 | 6/1961 | Radack | 220/242 |
| 3,137,535 | 6/1964 | Collier et al. . | |
| 3,243,504 | 3/1966 | Johnson . | |
| 3,514,526 | 5/1970 | Arnold, Jr. . | |
| 3,684,819 | 8/1972 | Wilson . | |
| 3,742,123 | 6/1973 | Haub, Jr. . | |
| 3,745,664 | 7/1973 | Altseimer . | |
| 3,880,194 | 4/1975 | McNeal . | |
| 3,885,852 | 5/1975 | Grove | 439/441 |
| 3,956,576 | 5/1976 | Jensen et al. . | |
| 3,970,772 | 7/1976 | Ballard . | |
| 4,159,858 | 7/1979 | Toraya | 439/38 |
| 4,484,021 | 11/1984 | Schaefer et al. | 174/53 |
| 4,640,985 | 2/1987 | Martin et al. . | |
| 4,907,711 | 3/1990 | Stuchik, III . | |
| 4,970,353 | 11/1990 | Kotz . | |
| 5,212,351 | 5/1993 | Raines . | |
| 5,223,673 | 6/1993 | Mason . | |
| 5,469,614 | 11/1995 | Lyonnais . | |

*Primary Examiner*—Kristine Kincaid
*Assistant Examiner*—Dhiru R Patel
*Attorney, Agent, or Firm*—Buchanan Ingersoll, P.C.

[57] ABSTRACT

An apparatus for insulating an electrical box is used for removing an energized electrical device from an outlet box. A removable shield, which is made from electrically-insulating material, acts an insulating barrier between the outlet box and the electrical device terminals to prevent inadvertent shorting and shock and injury to the electrician. Preferably, a pair of shields which can be inserted along the sides of an exposed outlet box in the space between the electrical device and the outlet box. Each shield is sized so that it covers at least that portion of the side of the electrical device having the terminal screws. Once the shields are properly inserted, the electrical device can be grasped by the electrician and safely removed from the outlet box.

5 Claims, 4 Drawing Sheets

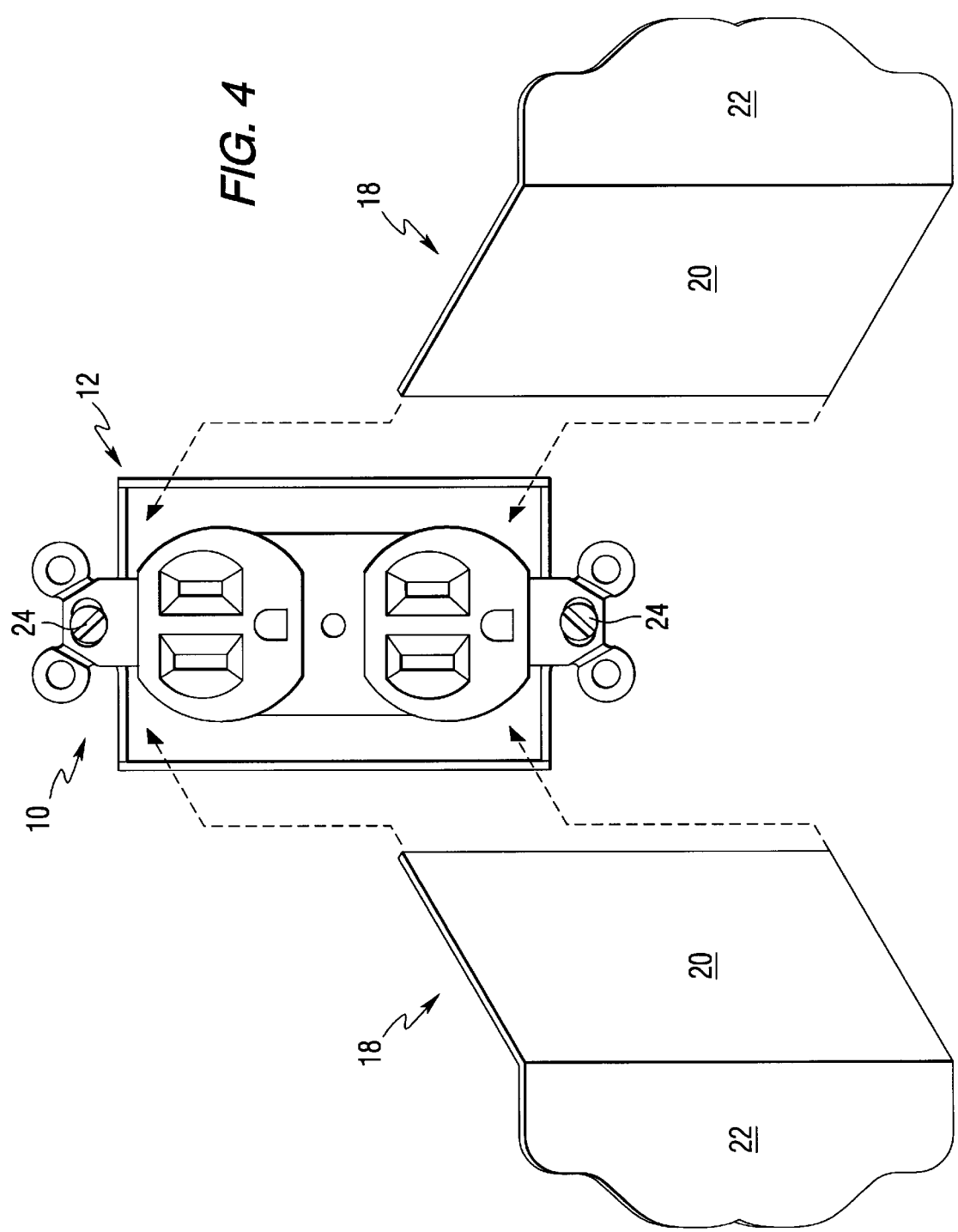

INSULATING COVERS FOR AN ELECTRICAL OUTLET BOX

This application is a continuation of U.S. application Ser. No. 08/668,536, filed Jun. 17, 1996 is abandoned.

1. Field of Invention

The present invention relates to an apparatus for insulating an electrical box and, more particularly, to a removable apparatus for use with electrical devices mounted in electrical outlet boxes.

2. Discussion of Background Art

A variety of electrical devices are installed in the walls of homes and offices. These electrical devices typically include electrical outlets, snap lights switches, single receptacles, duplex receptacles and single pole, double pole, three way, and four way switches. These devices are mounted within outlet boxes, which are metal boxes substantially but not completely closed on five of their six sides. The outlet boxes are attached to the wall studs or other framing in such a way that the electrical devices will be flush with the wall surface when attached thereto and a cover plate placed there over. An outlet box may have several holes for admitting electrical wires or cables to power the electrical devices. Although the outlet boxes are grounded, one or more terminals on the electrical device installed therein will be at an electrical potential above ground potential.

Experienced electricians trained in the maintenance of electrical systems often remove an electrical device from the outlet box for repair, replacement, or maintenance while the electrical device remains in an electrically-energized state. As the electrical device is withdrawn from the outlet box, a potential exists for the inadvertent shorting between the terminal screws of the device and the metallic outlet box. A potential also exist for electrical shock or injury to the electrician performing the work if he or she accidentally touches the energized terminal screws and a grounded source simultaneously.

Although shutting off the electrical power before performing electrical repair or maintenance is always recommended as the safest method, it may be necessary for the power to the electrical device to remain on. For example, during electrical troubleshooting procedures or when the exact electrical circuit or circuit breaker feeding the device cannot be readily determined, even an experienced electrician will leave the electrical power operative for the electrical device being examined.

FIG. 1 shows an electrical device such as duplex receptacle 10 provided within outlet box 12. FIG. 2 shows the electrical device 10 in a removed state relative to outlet box 12. As best seen in FIG. 2, electrical device 10 includes terminal screws 14 which secure electrical wires 16 to electrical device 10. Inadvertent contact of terminal screws 14 with outlet box 12 during the removal of electrical device 10 may cause shorting and electrical shock or injury to the electrician.

In order to prevent this inadvertent shorting and potential shock or injury to the electrician, there is a need for an easily implementable solution for preventing such shorting of the electrical device.

SUMMARY OF THE INVENTION

An apparatus for insulating an electrical box is provided which can be used for removing an energized electrical device from an outlet box. The present apparatus can be utilized as a standard tool to provide added safety and protection to an electrician and to protect the electrical equipment from damage. The present apparatus for insulating an electrical device is in the form of a shield which is made from electrically-insulating material. The apparatus of the present invention acts as an insulating barrier between the outlet box and the electrical device terminals to prevent inadvertent shorting and shock and injury to the electrician.

The insulating apparatus of the present invention preferably includes a pair of shields which can be inserted along the sides of an exposed outlet box in the space between the electrical device and the outlet box. Each shield is sized so that it covers at least that portion of the side of the electrical device having the terminal screws. Once the shields are properly inserted, the electrical device can be grasped by the electrician and safely removed from the outlet box.

Other features and advantages of the present invention will be apparent to those skilled in the art from a careful reading of the detailed description of preferred embodiment presented below and accompanied by the drawings.

BRIEF DESCRIPTION OF THE DRAWINGS

FIG. 4 is an exploded front view showing the insertion of the pair of shield members of FIG. 3 according to a preferred embodiment of the present invention.

DETAILED DESCRIPTION OF THE PREFERRED EMBODIMENT

Figure 3:
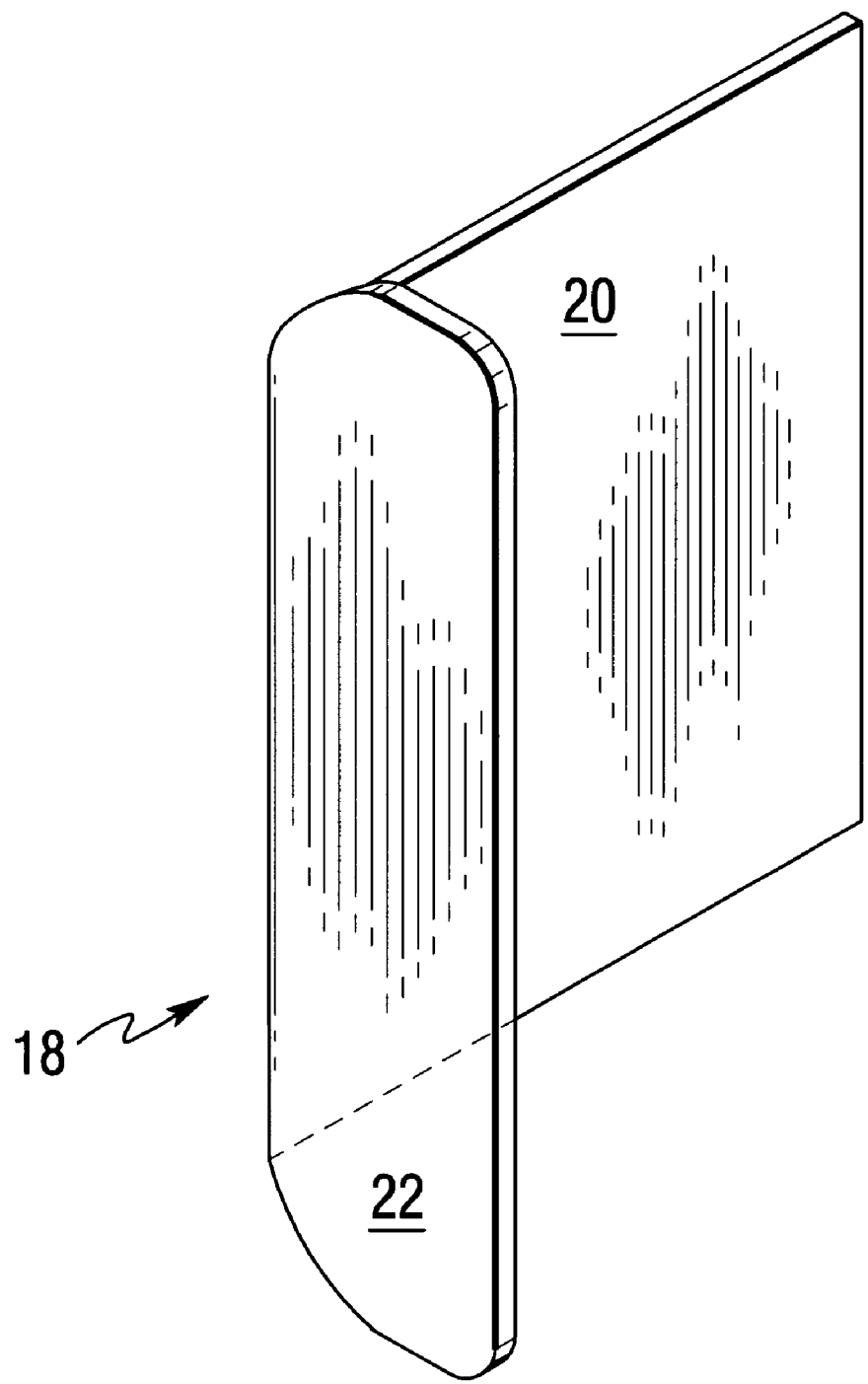
FIG. 3 is an isometric view of one of the pair of shield according to a preferred embodiment of the present invention.

FIG. 3 illustrates a presently preferred embodiment of one shield member 18 used in the present invention. In operation, a pair of shield members 18 are used to insulate the electrical device 10 from outlet box 12. Each shield device 18 includes side member 20 which is sized to fit within outlet box 12 in the space between electrical device 10 and outlet box 12. Shield member 18 also includes cover member 22 which is adapted to wrap around the front of electrical device 10 to cover the receptacles thereof. Shield member 18 can be formed from any electrically-insulating material such as rubber or an insulating plastic.

Figure 2:
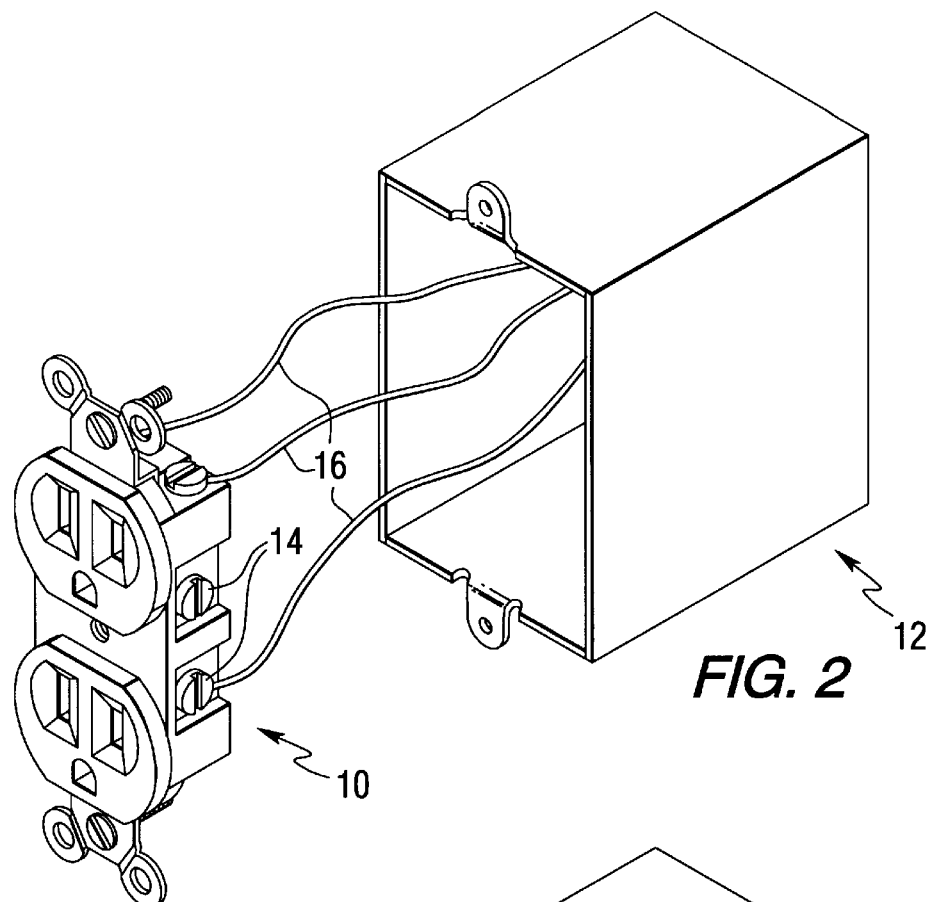
FIG. 2 is an isometric view of the electrical device of FIG. 1 removed from the outlet box in a procedure utilized in the prior art.

FIG. 4 illustrates the insertion of the present apparatus into outlet box 12. As shown in FIG. 4, a pair of shield members 18 are inserted on opposite sides of electrical device 10 in the space between device 10 and outlet box 12. As can be seen from FIG. 4, shield members 18 must be sized so that they are no larger than the height of outlet box 12. However, shield members 18 must be of sufficient size so that they cover the terminal screws (shown as 14 on FIG. 2) of electrical device 10.

Figure 1:
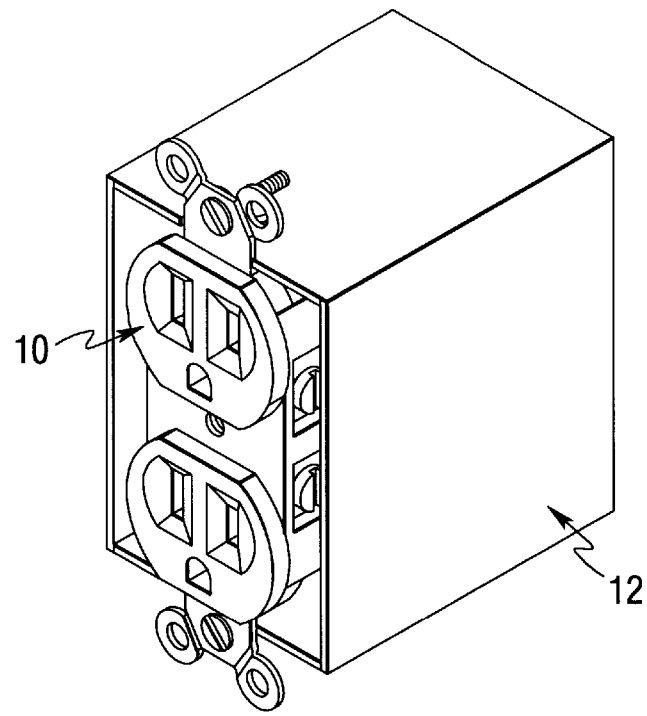
FIG. 1 is an isometric view of an electrical device installed in an outlet box.
Figure 5:
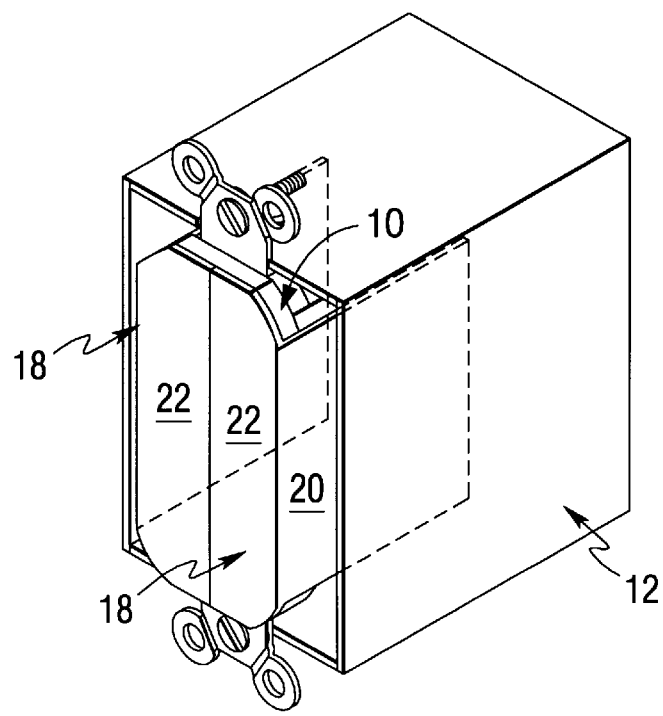
FIG. 5 is an isometric view of an electrical device installed in an outlet box having the shield members of FIG. 3 installed thereon.

FIG. 5 shows electrical device 10 installed in outlet box 12 wherein the pair of shield members 18 have already been installed. Preferably, as shown in FIG. 5, cover members 22 of shield members 18 wrap around the receptacle face of electrical device 10. Preferably, the cover members 22 of shield members 18 are sized so that they overlap on the face of electrical device 10. Cover members 22 prevent the inadvertent insertion of metal objects such as screw drivers and other tools into the otherwise exposed receptacle outlets of electrical device 10.

Figure 6:
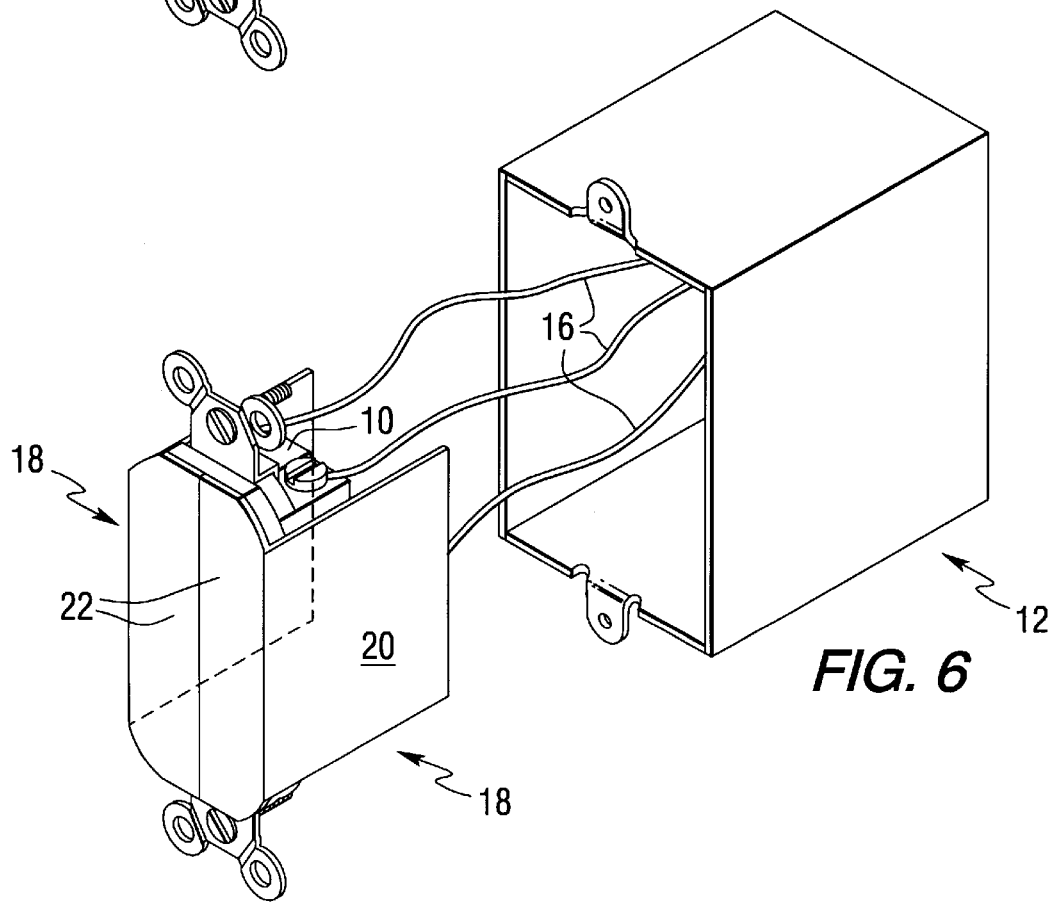
FIG. 6 is the electrical device of FIG. 5 shown during removal from the outlet box.

FIG. 6 shows the electrical device 10 removed from outlet box 12. As shown in FIG. 6, side members 20 of shield members 18 cover the sides of electrical device 10 and, in particular, cover the terminal screws 14 which are connected to electrical wires 16. In this manner, an electrician is protected from accidental shorting of the terminal screws 14 when such screws contact outlet box 12.

An advantage of the present insulating apparatus is its ability of shield members 18 to be inserted into outlet box 12 only when needed by an electrician. There is no need to retrofit existing outlet boxes 12 with a permanent device such as illustrated in U.S. Pat. No. 5,212,351. The pair of shield members 18 of the present invention is of suitable size to be included in a standard tool box carried by an electrician.

In operation, shield members 18 are inserted between the sides of electrical device 10 and the outlet box 12 prior to the removal of the electrical device 10 therefrom. One shield member 18 is installed on one side of device 10 and a second shield member 18 is installed on the opposite side of the device 10. The cover members 22 of the shield members 18 overlap so that they cover the front face of the electrical device 10. The side members 20 of the shield members 18 cover the terminal screws 14 of electrical device 10.

Once each shield 18 is inserted into outlet box 12, the screws 24 shown in FIG. 4 which are used to fasten electrical device 10 to outlet box 12 can be removed. Shield members 18 are held in place by the electrician as the electrical device 10 is removed from outlet box 12. The insulation provided by shield member 18 provides protection between the energized terminal screws 14 and the metallic outlet box 12 so as to prevent accidental arcing or shorting to ground of the electrical device 10. In this manner, the pair of shield members 18 also provide added protection to the electrician against accidental electrical shock or injury.

It will be apparent to those skilled in the art that many changes and substitutions can be made to the preferred embodiment herein described without departing from the spirit and scope of the present invention as defined by the following claims.

I claim:

1. An apparatus for an electrical device having external electrical connections for insulating said electrical device within an electrical outlet box comprising a pair of shield members formed from non-conducting material, each of said pair of shield members having a side portion sized and positioned to cover said external electrical connections on said electrical device wherein said shield members are inserted between said electrical device and said electrical outlet box prior to removal of said electrical device from said electrical outlet box, each of said pair of shield members displaceable towards each other to grip said electrical device between said side portion of each of said pair of shield members while removing said electrical device whereby said pair of shield members are removed from said electrical outlet box during the removal of said electrical device from said electrical outlet box.

2. The apparatus of claim 1 wherein each of said pair of shield members further comprise a cover member, said cover member wrapping around a face of said electrical device, said cover member blocking access to the face of the electrical device.

3. The apparatus of claim 1 wherein each of said pair of shield members is formed from an electrically insulating material.

4. The apparatus of claim 3 wherein said electrically insulating material is rubber.

5. The apparatus of claim 3 wherein said electrically insulating material is an insulating plastic material.

* * * * *